Sept. 3, 1968    B. D. OSGOOD    3,400,040
TRIM STRIP WITH HEAT SEALED EDGE FOLDS
AND METHOD OF MAKING SAME
Filed Nov. 30, 1964
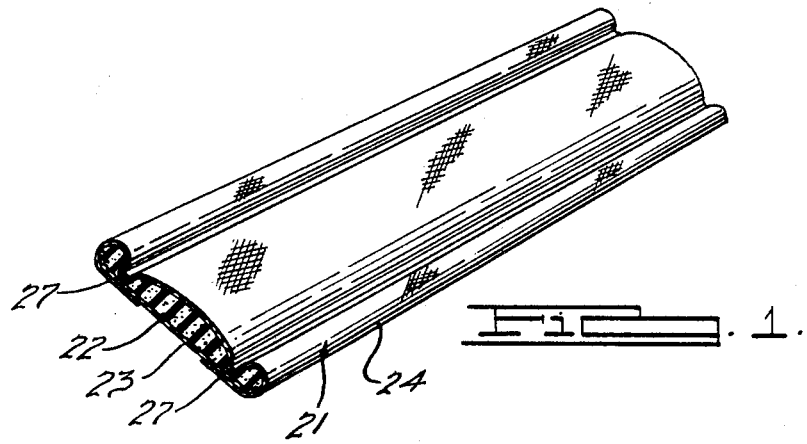
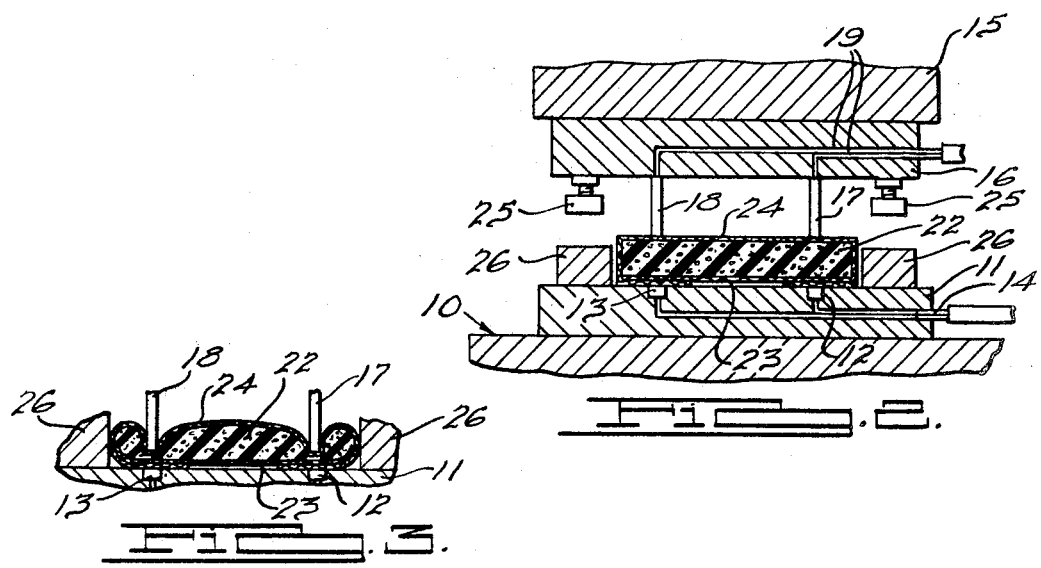
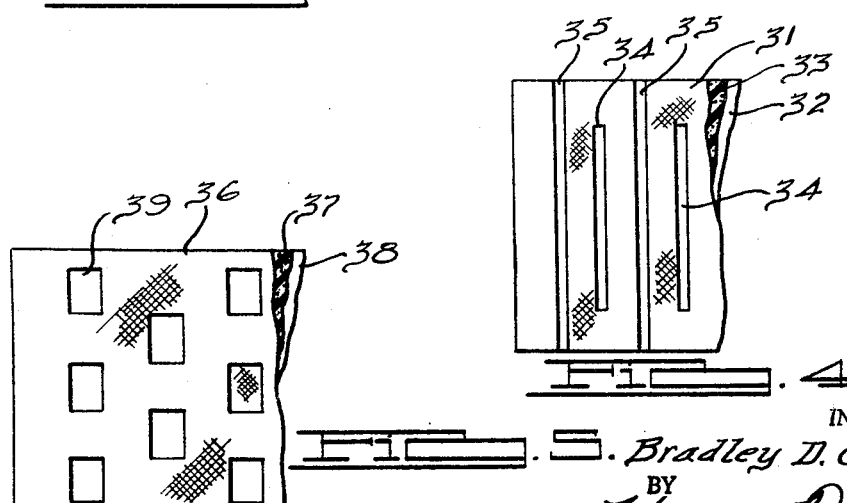
INVENTOR.
Bradley D. Osgood.
BY
Carners, Dickey & Pierce
ATTORNEYS.

3,400,040
TRIM STRIP WITH HEAT SEALED EDGE FOLDS AND METHOD OF MAKING SAME
Bradley D. Osgood, 1126 S. Channel,
Harsens Island, Mich. 48028
Filed Nov. 30, 1964, Ser. No. 414,701
2 Claims. (Cl. 161—104)

ABSTRACT OF THE DISCLOSURE

The flexible trim strip of the present invention uses a heat sealable sheet placed upon an open cellular strip with the edges of the sheet bent under the strip. Pressure is applied to areas of the layer and the bent-under edges to compress the cellular strip to a degree which retains the cells open. Heat is applied to the areas to soften the material of the sheet which will pass through the open cells of the cellular strip and retain the layer and bent-under edges in fixed relation to each other when the areas are cooled.

---

Decorative covers for seats, trim strips, and the like have been made of different materials which were stitched together to form upholstered trim articles heretofore employed in the art. The present invention eliminates the use of stitching and provides upholstered articles and trim strips by method employing compressed areas in the material which are heat sealed to bond the materials together along decorative lines. While the method may be applied to any type of composite resilient trim articles, an example herein is employed by way of illustration rather than by limitation.

In the example, a strip of open cellular material such as polyurethane, having a cloth backing, is encompassed by a strip of plastic material which will heat seal such as a vinyl plastic which may be plain, grained and of any color. The encompassing strip extends across the top, the two side edges and folds under the bottom of the cellular strip with the ends in spaced relation to each other. The strip is led into a press having a pair of electrodes above and below the strip spaced inwardly from the side edges after which the upper electrodes are moved downwardly to compress edge grooves in the assembled material which may be of any length, depending upon the size of the press. When the press finishes its downward stroke the electrodes do not compress the material at the grooves to a solid state but is stopped short thereof so that the open cellular material has the cells open along the compressed grooves so that the heated material can pass therethrough. The dielectric heating method produced by the electrodes heat the encompassing material from the inside so that when melted, the material can pass through the open cells of the polyurethane strip and when cooled will join the lapped ends to the top section of the cover material along the groove and secure the assembled materials together. Polyurethane being in final cured stage will not soften in the presence of the heat and it is necessary therefore that the open cellular structure thereof remain open when the groove is compressed in the assembled materials so that the melted vinyl and like materials can pass therethrough and join the cover material at the bottom of the groove in unit-secured relation to each other and the core material when the molten material is cooled. Any design may be made in different articles having a polyurethane central layer which provides softness thereto and permits the binding of the top and bottom layers of the heat sealable material together through the open cells thereof in the design area which are maintained open when compressed to less than a maximum degree.

The main objects of the invention are: to construct an article of open cellular material encompassed by a heat sealable plastic material having formed areas in which the plastic material is joined together through the cells of the cellular material; to join the overlapped layers of heat sealable material about an open cellular material by heating the plastic material dielectrically in predetermined areas which have been compressed to a degree where the cells of the cellular material are still open and pervious to the flow of the melted plastic material therethrough; to provide a method for securing a top and bottom layer of heat sealable material together with an open cellular material therebetween which is unaffected by heat by compressing the layers together in predetermined areas where the cells are still open for the passage of melted material of the top and bottom layers thereto which bonds the heat sealable materials together in unit relation with the cellular material, and in general to provide an article and method of production which is simple and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a perspective view of an article made in accordance with the method of the present invention;

FIGURE 2 is a diagrammatic sectional view of a press in which the article of FIGURE 1 is produced before the material is compressed;

FIGURE 3 is a view of the structure illustrated in FIGURE 2, after the material is compressed and heated;

FIGURE 4 is a broken plan view of an article which was manufactured by the method employed in manufacturing the article of FIGURE 1; and FIGURE 5 is a view of the structure, similar to that illustrated in FIGURE 4, showing another form thereof.

The example herein illustrated to show the process of the invention and articles produced therefrom embodies a press 10 having a plate 11 thereon containing a pair of electrodes 12 and 13 which are joined by conduits 14 to a suitable source of electric energy. The movable head 15 of the press carries a plate 16 and a pair of electrodes 17 and 18 which are joined by conductors 19 to said source of energy. The electrodes 12, 13 and 17, 18 are in aligned relation and are of substantial length depending upon the length of the article 21 to be produced. The article 21 herein illustrated is of substantial length and is made from a central core 22 of open cell polyurethane having a cloth backing 23 secured thereon by a latex or other substance. A heat softening plastic cover strip 24, which may be of a vinyl or similar material, is folded around the edges and beneath the bottom of the core 33 as it is fed onto the plate 11 in the conventional manner. After the material has been positioned within the press 10, as illustrated in FIGURE 2, the head 15 is lowered and stopped before the electrodes 17 and 18 solidly compress the layers of material against the electrodes 12 and 13. This stop may be controlled in the mechanism for lowering the head or suitable adjustable stop elements 25 may be carried by the head to stop against blocks 28. The blocks limit the lateral spread of the cover strip 24 as the grooves 27 are formed in the assembled materials. By preventing the bottoming of the electrodes 17 and 18 on the materials, the open cells of the core 22 remain open so that the melted material of the cover strip 24 can flow therethrough and bridge the two layers of the cover strip and thereby bond them together.

The conductors 14 and 19 carry high frequency current through the electrodes close to the material of the cover strip 24 and the internal heat resulting therefrom melts the adjacent internal surfaces of the cover strip. The molten material will be forced through the open cells of the core member 22 by the pressure between the electrodes 12, 13 and 17, 18. The material of the cover srtip 24 extending through the open cells of the core, secures the top and bottom layers of the strip 24 in firm fixed relation to each other when the material is cooled which occurs immediately upon interrupting the flow of current to the electrodes. When the strip is removed from the press the top and bottom layers are securely bonded together along the grooves 27 through the core 22 thereby providing a finished product which is resilient and pleasing in appearance.

The same process can be employed on many other articles as illustrated in FIGURE 4 for example. A top layer of heat sealable material 31 is bonded to a bottom layer 32 of similar material through a central layer 33 of open cellular polyurethane or like material which does not soften when heated. The grooves 34 and 35 are formed therein by similar electrodes 12, 13 and 17, when moved together in a press to a degree that the cellular srtucture is still open. The melted material of the outer layers will flow through the cells when the electrodes have the high frequency current passed therethrough. The layers 31, 32 and 33 are securely bonded together by the cooled material of the top and bottom layers 31 and 32 which extends through the cells of the material 33 in the compressed areas.

In FIGURE 5, a similar article is illustrated which embodies a top layer 36 of the heat sealable material disposed upon an open cellular layer 37 which rests upon a bottom layer 38 of heat sealable material. Rectangular areas 39 are pressed in the layers by electrodes through which high frequency current is passed to melt the material of the layers 36 and 38 from the inside in the areas so that it will flow through the cells of the central layer 37. Upon cooling, the top and bottom layers 36 and 38 are secured together through the central layer in firm fixed relation to each other with a desired pattern on the front layer. It is to be understood that the areas may be circular, of any curvature or of any form and is not limited to the rectangulars and grooved areas as herein illustrated. The novelty of the invention resides in the provision of depressed areas in an article having top and bottom layers secured together through the open cells of an interior layer. With this arrangement, the layers are secured together at the areas in permanent fixed relation to each other.

What is claimed is:

1. In a flexible trim strip, a central core of open cellular material of narrow width and extending length, a narrow strip of heat sealable material on said core extending over the top, side edges and folded inwardly from each side edge at the bottom, and a pair of depressed lineal recesses compressed in the assembled materials inwardly from the side edges at which the top and inwardly folded side edges of the cover materials are anchored together by the material thereof extending through the open cells of the core material along the depressed lineal recesses at the side edges.

2. The method of forming a length of narrow trim material which includes the steps of: assembling a central layer of open cell cellular material with a top layer of heat sealable material which is folded at the sides under said central layer, compressing the layers along a line near each side edge to a degree that the cells of the central layer are still open, and heating the heat sealable material of the top layer and folds along said lines to cause it to flow through the open cells at the compressed areas so as to have the material of the top layer and bottom folds joined through the cells of the central layer in firm fixed relation to each other upon the cooling of the heated material to provide a flexible trim strip.

References Cited

UNITED STATES PATENTS

| 2,621,138 | 12/1952 | Messing | 156—209 |
| 2,621,139 | 12/1952 | Messing | 156—220 XR |
| 2,705,522 | 4/1955 | Kamborian | 156—216 |
| 2,729,010 | 1/1956 | Markas et al. | 156—219 XR |
| 2,774,410 | 12/1956 | Davies | 156—216 |
| 2,816,054 | 12/1957 | Howden | 156—220 XR |
| 3,026,233 | 3/1962 | Scholl et al. | 156—251 |
| 3,075,862 | 1/1963 | Hoyer | 156—219 XR |
| 3,170,250 | 2/1965 | Scholl. | |
| 3,174,887 | 3/1965 | Voelker | 156—216 XR |
| 3,244,571 | 4/1966 | Weisman | 156—196 |

ROBERT F. BURNETT, *Primary Examiner.*

R. H. CRISS, *Assistant Examiner.*